Patented Feb. 14, 1928.

1,659,366

UNITED STATES PATENT OFFICE.

ISAAC M. LADDON, WILLIAM A. RING, AND FRED W. HERMAN, OF DAYTON, OHIO, ASSIGNORS TO BENDIX BRAKE COMPANY, OF CHICAGO, ILLINOIS, A CORPORATION OF ILLINOIS.

WHEEL.

Application filed April 6, 1927. Serial No. 181,353.

This invention relates to wheels, and is illustrated as embodied in several wheels suitable for use on very heavy aeroplanes. An object of the invention is to secure the rim and a pair of disks permanently together to form the wheel, in a manner giving great strength, and which at the same time permits the use of light-weight material such as duraluminum.

Having this object in view, we prefer to secure the rim and the disks together by rolling or spinning their edge portions together, preferably over separate reinforcing rings or cores. If desired, rivets or other fastenings may be inserted through the overlapping portions of the disks and the rim, and through the rings.

The above and other objects and features of the invention, including various novel and desirable details of construction, will be apparent from the following description of the illustrative embodiments shown in the accompanying drawing, in which:

Each of Figures 1 to 5 inclusive is a partial radial section through the outer portion of one form of wheel embodying our invention.

Each wheel includes a drop center rim 10, to which are permanently secured side disks 12 and 14. As the wheel is especially intended for use on very heavy aeroplanes, we prefer to make it as light as possible by using duraluminum for the rim and the two disks, the rim being rolled to the desired section and the disks being spun to give them the dished shape shown. The present invention relates to the means for securing the disks to the rim, in such a manner that the joints are actually the strongest part of the wheel.

Figure 1:
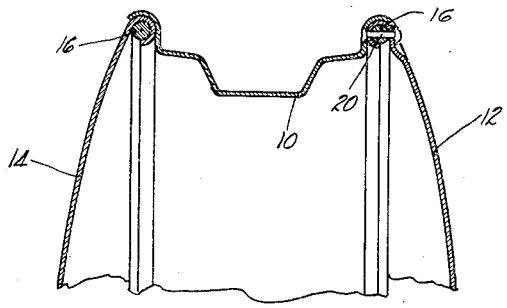
Figure 2:
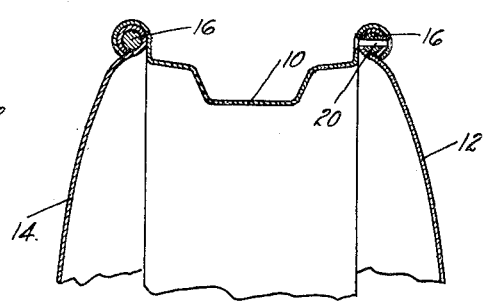
Figure 3:
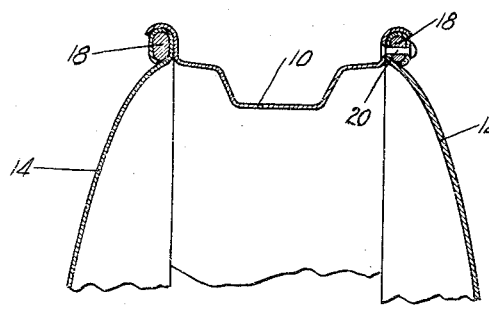
Figure 4:
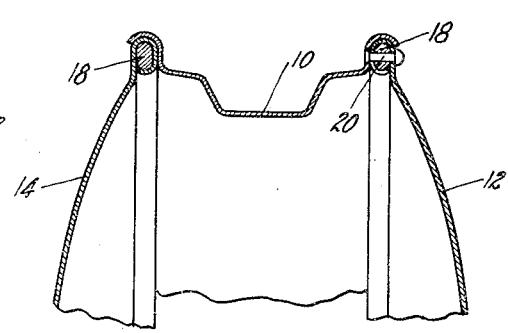
Figure 5:
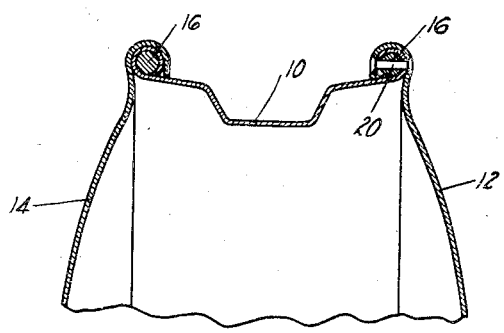

In the arrangements of Figures 1, 2, and 5, we use circular-section reinforcing rings 16, and in the arrangements of Figures 3 and 4 we use elliptical-section reinforcing rings 18.

In each of the figures, the edge portions of the rim and the disks are rolled or spun together over the reinforcing rings. In Figure 1, the edge portions of the disks are rolled inwardly over the rings, while the edge portions of the rim are rolled outwardly thereover. In Figure 2, the edge portions of the rim and the disks are all rolled outwardly over the rings, with the edge portions of the disks beneath the edge portions of the rim. Figure 3 is generally similar to Figure 2 except that the rings 18 are of elliptical section, while similarly Figure 4 corresponds to Figure 1 except for the shape of the rings 18. In Figure 5 the parts are rolled inwardly instead of outwardly, with the side portions of the rim beneath the side portions of the disks.

In any of the arrangements, if desired, fastenings such as rivets 20 may be passed through the superposed portions of the rim and the disks, and through rings 16 or 18, or these portions may be spot-welded together except in the case of some of the aluminum alloys with which welding is not feasible.

While several illustrative embodiments have been described in detail, it is not our intention to limit the scope of the invention to those particular embodiments, or otherwise than by the terms of the appended claims.

We claim:

1. A wheel comprising, in combination, a tire rim, disks at opposite sides of the rim, and rings at opposite sides of the rim, the edge portions of the disks and the rim being rolled together about said rings.

2. A wheel comprising, in combination, a tire rim, disks at opposite sides of the rim, and rings at opposite sides of the rim, the edge portions of the disks and the rim being rolled together about said rings, together with fastenings passing through each of said rings and through the portions of the rim and of the corresponding disk which surround said ring.

In testimony whereof, we have hereunto signed our names.

ISAAC M. LADDON.
WILLIAM A. RING.
FRED W. HERMAN.